Jan. 1, 1952        E. R. WILLIAMS        2,580,632
AUTOMOBILE SUN VISOR
Filed Aug. 15, 1950
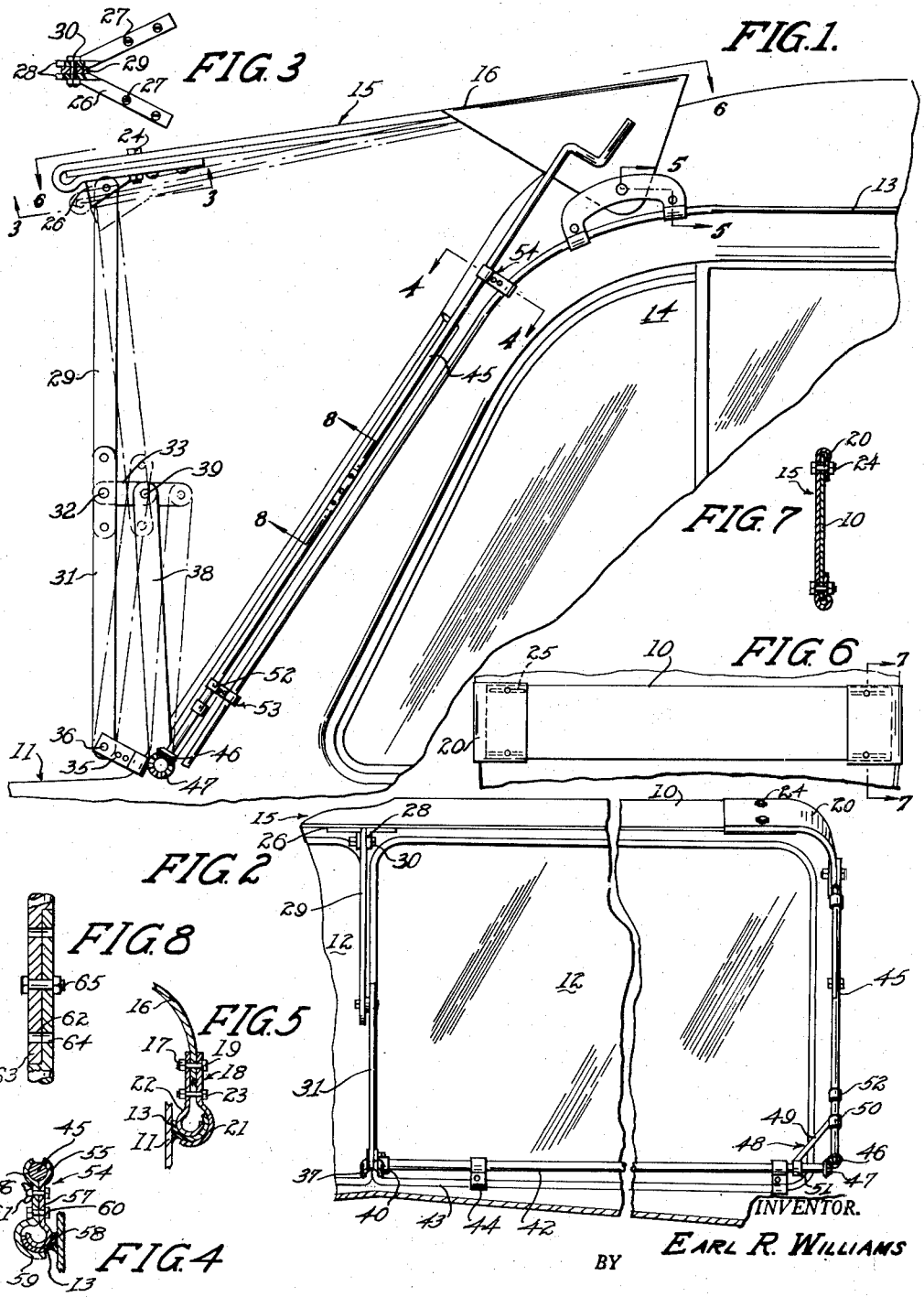
INVENTOR.
EARL R. WILLIAMS
BY McMorrow, Berman & Davidson
ATTORNEYS Patented Jan. 1, 1952

2,580,632

UNITED STATES PATENT OFFICE 2,580,632

AUTOMOBILE SUN VISOR

Earl Ray Williams, Sacramento, Calif.

Application August 15, 1950, Serial No. 179,582

2 Claims. (Cl. 296—95)

This invention relates to an automobile sun visor and more particularly to an automobile sun visor which may be installed in operative position on automobiles in angular overlying relation to the sloping windshields thereof.

Another object is to provide an automobile sun visor which may readily be adjusted after installation on an automobile to which it is attached without permanently marring the contours or surface thereof.

In the drawing:

Figure 1 is a partial side elevational view of an automobile to which the visor of this invention has been attached;

Figure 2 is a partial front elevation view of the automobile and visor of Figure 1;

Figure 3 is a view of a mounting bracket taken along the line 3—3 of Figure 1;

Figure 4 is a sectional view taken along the line 4—4 of Figure 1;

Figure 5 is a sectional view taken along the line 5—5 of Figure 1;

Figure 6 is a fragmentary section view taken on line 6—6 of Figure 1;

Figure 7 is a sectional view taken on the line 7—7 of Figure 6; and

Figure 8 is a sectional view taken on line 8—8 of Figure 1.

In Figure 1 there is shown a portion 11 of an automobile having a windshield 12, a rain gutter 13 and a left front window 14 constructed in a standard manner.

The visor of this invention is arranged to be supported above the windshield 11 and in angular overlying relation thereto and comprises a panel 15 of generally rectangular configuration. The panel 15 comprises a body or middle section 10 and a pair of end sections 20 telescopically receiving the middle section, as shown in Figures 2 and 6. Section 10 is provided with a pair of parallel slots 25 adjacent the ends thereof for the reception of bolts 24 carried by the section 20. In this manner, the panel 15 may be adjusted to accommodate cars of different widths.

Each of the sections 20 is provided at its outer end with an integral downwardly extending triangular bracket flange 16 having an aperture 17 therethrough for mounting the body section on the rain gutter 13 by means of clamping bracket 18 and bolt 19, extending through aperture 17 and aligned apertures (not designated) in bracket 18. Bracket 18 is mounted on gutter 13 and comprises a first curved member 21 encircling the lower surface of gutter 13 and a second curved member 22 complementary to the inner surface of gutter 13. Members 21 and 22 are secured together by means of bolt 23. The relationship of these parts is clearly shown in Figure 5.

Attached to the center of the underside of panel 15 by fastener 27 is a bracket 26, which has a pair of depending flanges 28 between which is pivotally mounted a lever arm 29 by a bolt 30. A link 31 is pivoted to the other or lower end of the arm 29 by a transverse pivot 32 and an arm 33 is pivoted on the pivot and extends downwardly therefrom.

The other end of lever arm 32 is pivotally mounted in a bracket 35 by means of a bolt 36, the bracket being secured to the center strip 37 of the windshield 12.

A lever arm 38 is pivotally secured at one end to the other end of link 33 by fastening means 39. The other end of lever arm 38 is mounted on a shift rod 42 for rotation therewith. Rod 42 is rotatably mounted on the lower strip 43 of windshield 12, as shown in Figure 2, by means of clamp brackets 44 and extends laterally from the center strip.

It is thus seen that elements 29, 33, 38 and 42 constitute an operative linkage effective to shift panel 15 upon rotation of shift rod 42. Element 32 forms a suitable support on center strip 37 for panel 15.

Means is provided for effecting a rotative movement of the panel sections by rotating the shaft 42, the means being easily accessible to the operator of the vehicle and being of a convenient operating nature. The means includes a crank 45 rotatably journalled on the gutter 13 and having its lower end terminating in adjacency to the outer end of the shaft 42 with engaging bevel gears 46 and 47 being fixed on the adjoining ends thereof. A clamp 48 is positioned between the geared ends of the crank and shaft and includes a strap 49 having bearing ends 50 and 51 receiving the crank and shaft respectively and retaining the gears in meshing engagement. The crank is journalled in bearings 52 bracketed onto the gutter 13 by clamps 53 and projecting outwardly from the gutter with the bearing 54 forming a locking means to lock the crank against rotation. The bearing 54 includes a pair of complementary semi-circular sections 55 and 56 receiving the crank and secured in the manner of bracket 18 to the gutter 13. Thus, flanges 57 extend from the sections and terminate in arcuate clamping members 58 and 59 engaged interiorly and exteriorly in cooperative fashion on the gutter 13 with the flanges being transversely apertured to receive a fastening means 60. One of the fastening means includes a bolt and wing nut unit 61, the wing nut serving as an adjustable locking member for clamping the bearing sections tightly on the crank.

For diversified installation with respect to many vehicle body styles and contours, the crank is extensible, as in Figure 8, wherein the crank consists of two sections terminating in mating tongues 62 and 63, which are transversely apertured. The apertures 64 in each tongue section are selectively registerable for the reception of a fastener 65.

In adjusting the panel 15, the wing nut is loosened and the crank is rotated to effect a corresponding rotation of the shaft 42, which during its rotative movement, swings the visor panel inwardly and outwardly relative to the windshield, the panel pivoting about the pivots 19.

It is thus apparent that this invention provides a novel automobile sun visor which is readily adjustable by the operator without in any way interfering with his operation of the vehicle. Furthermore, the visor is adjustable in length and is thereby arranged to fit a vehicle of any size. Finally, all of the parts of the visor are detachably secured to external positions of the automobile, thus making the visor readily and easily mountable and detachable, without in any way marring the portions of the automobile.

What is claimed is:

1. An automobile sun visor comprising an axially extensible sectional panel adapted to overlie the windshield of an automobile, means pivotally mounting the opposing ends of the panel on the opposing side gutters of an automobile with the panel swingably overlying in angular relationship the windshield of an automobile, a shift rod rotatably journalled on the lower strip of the windshield and extending between the middle and one of the vertical ends of the windshield, a linkage connected between the panel and the rod for moving the panel relative to the windshield in response to rotation of the shift rod, actuating means connected to the rod and positioned accessible to the front side door of an automobile, and means for locking said last means to lock the panel in adjusted positions, said actuating means including a crank rotatably journalled on one of the side gutters in advance of the door and gear means connecting the crank to the rod.

2. An automobile sun visor comprising an axially extensible sectional panel adapted to overlie the windshield of an automobile, means pivotally mounting the opposing ends of the panel on the opposing side gutters of an automobile with the panel swingably overlying in angular relationship the windshield of an automobile, a shift rod rotatably journalled on the lower strip of the windshield and extending between the middle and one of the vertical ends of the windshield, a linkage connected between the panel and the rod for moving the panel relative to the windshield in response to rotation of the shift rod, actuating means connected to the rod and positioned accessible to the front side door of an automobile, and means for locking said last means to lock the panel in adjusted positions, said actuating means including a crank rotatably journalled on one of the side gutters in advance of the door and gear means connecting the crank to the rod and said locking means including a clamp mounted on the said gutter and providing a bearing for the crank during rotation thereof and means for tightening the clamp to frictionally grip the crank.

EARL RAY WILLIAMS.

REFERENCES CITED

The following references are of record in the file of this patent:

UNITED STATES PATENTS

| Number | Name | Date |
| --- | --- | --- |
| 2,207,227 | Scott | July 9, 1940 |
| 2,383,912 | Gargiulo | Aug. 28, 1945 |
| 2,507,397 | Bracken | May 9, 1950 |